United States Patent Office 3,553,202
Patented Jan. 5, 1971

3,553,202
PRODUCTION OF AMINOACYLPENICILLINS
Brian William Hatt, Redhill, and Harry Smith, Maplehurst, near Horsham, England, assignors to Beecham Group Limited, Brentford, Middlesex, England, a British company
No Drawing. Continuation of application Ser. No. 533,818, Mar. 14, 1966. This application May 22, 1969, Ser. No. 828,435
Claims priority application Great Britain, Mar. 23, 1965, 12,138/65; July 17, 1965, 30,479/65
Int. Cl. C07d 99/16
U.S. Cl. 260—239.1                                5 Claims

ABSTRACT OF THE DISCLOSURE

Aminoacylpenicillins of the formula:

```
            S   CH3
           / \ /
R.CH.CO.NH.CH—CH   C
   |               \
   NH2              CH3
         |    |
         CO—N————CH.COOH
``` are produced by reacting an N-protected penicillin of the formula:

```
            S   CH3
           / \ /
R.CH.CO.NH.CH—CH   C
   |               \
   NH2              CH3
   |     |    |
   COOXSO2R1  
         CO—N————CH.COOH
``` wherein
R is a substituted or unsubstituted alkyl, aralkyl, aryl or heterocyclic group,
$R^1$ is a substituted or unsubstituted alkyl, aralkyl or aryl group, and
X is a divalent saturated hydrocarbon moiety having from 2 to 6 carbon atoms linked to the groups on either side through adjacent carbon atoms,
with a suitable base in an aqueous or partially aqueous solution at a pH between 8 and 11.5 and at a temperature between 0° C. and 50° C. Non-toxic pharmaceutically acceptable salts also form part of the present invention.

---

This application is a continuation of application 533,818 filed March 14, 1966.

This invention relates to a process for the preparation of penicillins and is particularly concerned with the preparation of aminoacylpenicillins.

The penicillins produced by the process of the present invention are of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria.

The present invention provides a process for the preparation of penicillins of the formula:

```
            S   CH3
           / \ /
R.CH.CO.NH.CH—CH   C
   |               \
   NH2              CH3
         |    |
         CO—N————CH.COOH
``` and non-toxic salts thereof, wherein R is a substituted or unsubstituted alkyl, aralkyl, aryl or heterocyclic group, which process comprises reacting with a basic reagent a N-protected penicillin of the formula:

```
            S   CH3
           / \ /
R.CH.CO.NH.CH—CH   C
   |               \
   NH2              CH3
   |     |    |
   COOXSO2R1  
         CO—N————CH.COOH
``` wherein R is as hereinbefore defined, X is a divalent saturated hydrocarbon radical containing from 2 to 6 carbon atoms linked to the groups on either side through adjacent carbon atoms and $R^1$ is a substituted or unsubstituted alkyl, aralkyl or aryl group or a non-toxic salt thereof. Preferably X is an ethylene radical and $R^1$ is a p-tolyl group.

The salts are non-toxic salts including non-toxic metallic salts such as sodium, potassium, calcium and aluminum, the ammonium salt and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The N-protected penicillins (II) are prepared by reacting 6-aminopenicillanic acid or a salt thereof in aqueous or anhydrous media with a reactive derivative of a carboxylic acid of the general formula:

$$\begin{array}{c} R.CH.COOH \\ | \\ NH \\ | \\ COOXSO_2R^1 \end{array} \qquad (III)$$

where R, X and $R^1$ are as hereinbefore defined.

Examples of suitable reactive derivatives are mixed anhydrides (including those obtained by treating a salt of the acid in anhydrous medium with an alkyl chlorocarbonate) and the intermediates formed by reacting the acid with a carbodiimide, e.g. N,N'-dicyclohexylcarbodiimide, or with carbonyldiimidazole.

In a preferred form of the invention the N-protected penicillins (II) are not isolated but are converted to aminopenicillins directly in situ.

The aminopenicillins (I) are formed by the action of a base on the N-protected penicillin. Suitable bases include alkali metal hydroxides, alkali metal carbonates, alkaline earth metal hydroxides, alkali metal alkoxides, tertiary aliphatic amines, quaternary ammonium hydroxides, or suitable buffer solutions. The reaction is usually carried out in aqueous or partially aqueous solution at pH between 8 and 11.5 and at a temperature between 0° C. and 50° C., reaction at room temperature being particularly convenient. In general it is not advisable to expose the penicillin to the more drastic conditions of pH or temperature for longer than is necessary to complete the reaction.

The completion of reaction is indicated by the disappearance of the starting N-protected penicillin, as shown by paper chromatography, the desired penicillin (I) being isolated and purified by any of the conventional procedures used for aminopenicillins.

In an alternative method of carrying out the present invention the N-protected penicillin (II) is treated with a non-aqueous base such as an alkali metal hydroxide (MOH) or alkoxide ($MOR^2$, where $R^2$ is an alkyl group) to form the carbamate salt

```
                S   CH3
               / \ /
R.CH.CO.NH.CH—CH   C—CH3
   |               |
   NH    CO—N————CHCOOM        (IV)
   |
   COOM
``` which is then converted to the aminopenicillin (I) by treatment with acid.

Other examples of non-aqueous bases suitable for use in the invention are metallo-organic compounds such as phenyl lithium, dimsyl sodium, and alkali metal thiolates such as sodium thiophenolate. Suitable solvents for the reaction include t-butanol, acetonitrile, formamide, dimethylformamide, N,N-dimethylacetamide, and dimethylsulphoxide. In one form of the invention salts of the compounds of the general Formula II, dissolved or suspended in anhydrous organic solvents such as dimethylformamide or N,N-dimethylacetamide, are treated for some minutes or hours at ambient temperature with a slight excess of a metallo-organic compound such as potassium t-butoxide or sodium thiophenolate. The mixture is then diluted with water and acidified, extracted with a water-immiscible organic solvent such as chloroform to remove any unreacted II, readjusted to pH 4–5, and finally concentrated in vacuo to give the amino penicillin.

The penicillins prepared according to the present invention may contain asymmetric carbon atoms in the side chain and may exist in D- and L-forms. It is to be understood that the present invention includes both the D- and L-forms as well as mixtures thereof.

The following examples illustrate the present invention:

EXAMPLE 1

A solution of sodium 6[D-α(2-p-toluenesulphonylethoxycarbonylamino) - α-phenylacetamido]penicillanate (20 g.) in water (90 ml.) was brought to and maintained at pH 11.2 with triethylamine and stirred at room temperature for 30 minutes, during which time a white crystalline precipitate formed. The mixture was extracted with ether (100 ml.) in which the solid dissolved, and the extracts were discarded. The aqueous phase was covered with isobutyl methyl ketone (100 ml.) and the mixture was stirred vigorously and brought to pH 1.5 by addition of concentrated hydrochloric acid. The layers were separated and the aqueous phase was adjusted to pH 5.3 with 10 N sodium hydroxide solution, then set aside in the refrigerator for 3 hours. The colourless crystals which separated were collected, washed with water (10 ml.) and dried in an air oven at 35–40° to give 6[D(—)α-amino - α - phenylacetamido]penicillanic acid trihydrate (3.06 g.), M.P. 200–201° (decomp.), $[α]_D^{20}$ +257° (c. 0.5 in $H_2O$).

(Found (percent): C, 47.5; H, 6.4; N, 10.6; S, 8.0. Calculated for $C_{16}H_{19}N_3O_4S$, 3 $H_2O$ (percent): C, 47.6; H, 6.2; N, 10.4; S, 8.0).

EXAMPLE 2

In a series of experiments the potassium salt of 6-[D-α-(2-p-toluene sulphonylethoxycarbonylamino)-α-phenylacetamido]penicillanic acid was treated with different basic reagents under various conditions. In each experiment 0.005 mol of the penicillin was dissolved or suspended in 5.0 ml. of the solvent chosen and treated with the basic reagent for a certain time. Water was then added and the reaction mixture neutralized, washed twice with ether and assayed for its penicillin content. The relative amount of the starting material (A) and of the 6 - [D(—)T-amino-α-phenylacetamido]penicillanic acid (B) formed was determined by paper chromatography. In the solvent system used (butanol-ethanol-water 4:1:5, top layer) the two compounds were well separated ($R_f$= 0.65–0.70 and 0.35–0.40 respectively).

The 6 - [D-α-(2-p-toluenesulphonylethoxycarbonylamino)-α-phenylacetamido]penicillanic acid used in the experiment was prepared by treatment of 6-aminopenicillanic acid in aqueous solution at pH 7 with 2-toluenesulphonylethoxycarbonylchloride. It was extracted with ether at pH 2 and then isolated as its potassium salt by extraction of the ether solution with potassium bicarbonate solution and freeze-drying the obtained aqueous phase.

The results of the experiments are given in the following table:

| Reagent | Equivalent used | Solvent | Reaction time, (hours) | Yield of penicillin, percent | Compositon of product, percent | |
|---|---|---|---|---|---|---|
| | | | | | A | B |
| KOH | 1.1 | $C_2H_5OH$ | 0.15 | 7 | 40 | 60 |
| $C_2H_5ONa$ | 1.1 | $C_2H_5OH$ | 0.1 | 28 | 50 | 50 |
| $C_6H_5Li$ | 1.1 | H—$CON(CH_3)_2$ | 1 | 54 | 10 | 40 |
| $[CH_3SOCH_2]_{Na}$+ | 1.1 | $CH_3SOCH_3$ | 0.75 | 88 | 10 | 60 |
| $(CH_3)_3C$—OK | 1.1 | $(CH_3)_3COH$ | 1.5 | 90 | 60 | 40 |
| $(CH_3)_3C$—OK | 1.1 | $CH_3CN$ | 1 | 30 | | 100 |
| $(CH_3)_3C$—OK | 1.1 | $CH_3SOCH_3$ | 1 | 35 | | 70 |
| $(CH_3)_3C$—OK | 1.1 | H—$CON(CH_3)_2$ | 1 | 76 | | 95 |
| $(CH_3)_3C$—OK | 1.1 | H—$CON(CH_3)_2$ | 0.1 | 96 | | 100 |
| $(CH_3)_3C$—OK | 1.1 | $CH_3CON(CH_3)_2$ | 1 | 103 | 5 | 95 |
| $C_6H_5SNa$ | 1.1 | H—$CON(CH_3)_2$ | 1 | 81 | | 100 |

EXAMPLE 3

The potassium salt of α-2-p-toluenesulphonylethoxycarbonylamino)-γ-methylthiopropylpenicillin (4 g. 0.0065 mol) was stirred in 100 ml. of dry dimethylformamide and treated with sodium thiophenolate (0.9 g. 0.007 mol) for one hour. The mixture was poured into water, acidified to pH 2 and washed with chloroform. The aqueous phase was adjusted to pH 4.5 and concentrated in vacuo at room temperature to give several fractions of solid material. One of the fractions (1.1 g.) contained α-amino-γ-methylthiopropylpenicillin with a purity of 45% (hydroxylamine assay with the potassium salt of benzylpenicillin as standard).

This product contained in its IR-spectrum a strong band at 1770 cm.$^{-1}$, characteristic for the β-lactam ring of a penicillin, and was found to inhibit the growth of Staph. aureus Oxford at a concentration of 0.25 mcg./ml.

In a similar manner, the following aminopenicillins were prepared from the corresponding 2-p-toluenesulphonylethoxycarbonyl compounds. In the table are given: yield and purity of the purest fraction obtained in each case and the minimum inhibitory concentration (M.I.C.) against Staph. aureus Oxford observed for this product in a serial dilution test on agar plates.

| Penicillin | Yield, percent | Purity, percent | M.I.C., mcg./ml. |
|---|---|---|---|
| α-Aminopropylpenicillin | 39 | 34 | 1.25 |
| α-Aminobutylpenicillin | 23 | 31 | 1.25 |
| α-Aminopentylpenicillin | 70 | 39 | 0.63 |
| α-Amino-γ-methylthiopropylpenicillin | 42 | 38 | 0.25 |

EXAMPLE 4

The potassium salt of α-(2-p-tolylsulphonylethoxycarbonylamino)-γ-methylbutylpenicillin (2.7 g. 0.0045 mol) and potassium tert. butoxide (5.5 ml. of 0.89 N solution in t-butanol, 0.0049 mol) were stirred together in 50 ml. of dry dimethylformamide for 10 minutes. The mixture was poured into water and acidified to pH 2 and washed with ether. The aqueous phase was then adjusted to pH 4.5 and concentrated in vacuo to give 0.5 g. of α-amino-γ-methylbutylpenicillin with a purity of 55% (hydroxylamine assay with the potassium salt of benzylpenicillin as standard).

The IR-spectrum of this product contained a strong band at 1765 cm.$^{-1}$, indicated the presence of a β-lactam ring.

EXAMPLE 5

A mechanically stirred solution of the potassium salt of 6[D-α(2-p-toluenesulphonylethoxycarbonylamine) - α-phenylacetamido]penicillanic acid (purity 94%; 6.1 g., 0.0094 mole) in dimethylformamide (100 ml.) was treated with 0.99 N potassium t-butoxide in t-butanol (11.1 ml., 0.011 mole) at room temperature. After 5 minutes the resulting mixture was cooled to −5° and 2 N hydrochloric acid (10 ml. 0.02 mole) was added dropwise with vigorous stirring. To the almost clear solution thus obtained ether (100 ml.) was added to give 6[D(−)-α-amino-α-phenylacetamido]penicillanic acid as a precipitate, which after washing with ether and drying weighed 4.7 g. and had a purity of 547 (hydroxyamine assay); i.e. a total yield of 77%.

A part of the product (2.3 g.) was purified by dissolving it in water (32 ml.) at pH 1.8 and reprecipitating it by adjustment of the pH to 4.5. After standing for 30 minutes in the ice-bath the penicillin was filtered off, washed and dried to give 0.35 g. with a purity of 88.5%. [α]$_D^{20}$: +262° (c.=0.1, citrate-phosphate buffer pH 4.5). After concentration of the mother liquor a second crop (0.6 g.) was obtained with a purity of 74%. This corresponds to a total yield of 46%.

What is claimed is:

1. A process for the preparation of penicillins of the formula:

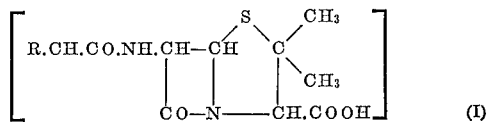

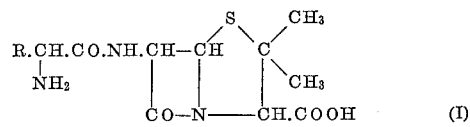

or a non-toxic salt thereof, where R is lower alkyl, lower alkylthio-lower alkyl or phenyl, which process comprises reacting a N-protected penicillin of the formula:

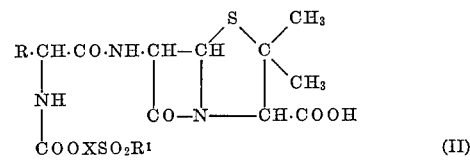

or non-toxic soluble salt thereof where X is a divalent saturated hydrocarbon moiety having from 2 to 6 carbon atoms linked to the groups on either side through adjacent carbon atoms and R$^1$ is phenyl, with an alkali metal hydroxide, alkali metal carbonate, alkaline earth metal hydroxide, alkali metal alkoxide, lower alkyl tertiary amine or quaternary ammonium hydroxide, the reaction being carried out in aqueous or partially aqueous solution at pH between 8 and 11.5 and at a temperature between 0° C. and 50° C.

2. A process as claimed in claim 1 wherein the N-protected penicillin (II) is prepared by reacting 6-aminopenicillanic acid or a non-toxic salt thereof in aqueous or anhydrous media with a reactive derivative of a carboxylic acid of the formula:

where R is a lower alkyl, lower alkylthio-lower alkyl or phenyl, X is a divalent saturated hydrocarbon moiety having from 2 to 6 carbon atoms linked to the groups on either side through adjacent carbon atoms and R$^1$ is phenyl.

3. A process as claimed in claim 1 wherein the N-protected penicillin (II) is prepared by reacting 6-aminopenicillanic acid or a non-toxic salt thereof in aqueous or anhydrous media with a mixed anhydride of a carboxylic acid of the formula:

where R is a lower alkyl, lower alkylthio-lower alkyl or phenyl, X is a divalent saturated hydrocarbon moiety having from 2 to 6 carbon atoms linked to the groups on either side through adjacent carbon atoms and R$^1$ is phenyl.

4. A process for the preparation of penicillins of the formula:

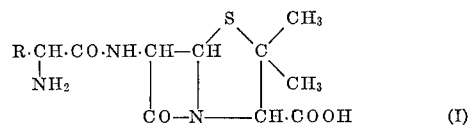

and non-toxic salts thereof, where R is a lower alkyl, lower alkylthio-lower alkyl or phenyl, which process comprises reacting a N-protected penicillin of the formula:

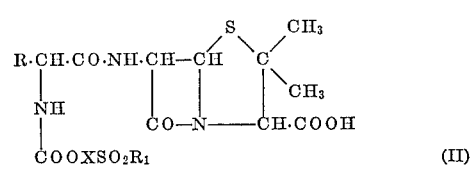

or a non-toxic soluble salt thereof where X is a divalent saturated hydrocarbon moiety having from 2 to 6 carbon atoms linked to the groups on either side through adjacent carbon atoms and R$^1$ is phenyl, with a non-aqueous base selected from the group consisting of an alkali metal hydroxide or alkoxide, an alkali metal derivative of benzene, phenylthiol and dimethylsulphoxide, the reaction being carried out in an inert anhydrous organic solvent and at a temperature below the decomposition temperature of the reactants to form the carbamate salt:

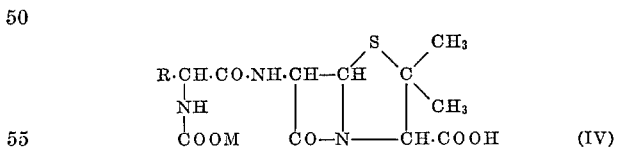

where M is an alkali metal moiety, and converting the carbamate salt to the aminopenicillin (I) by neutralization with acid.

5. A process as claimed in claim 1 wherein X is alkylene, and the non-toxic soluble salt of the N-protected penicillin is an alkali or alkaline salt.

References Cited

UNITED STATES PATENTS

| | | | |
|---|---|---|---|
| 2,917,502 | 12/1959 | Schwyzer et al. | 260—482X |
| 3,372,158 | 3/1968 | Hatt et al. | 260—239.1 |
| 3,433,784 | 3/1969 | Long et al. | 260—239.1 |

NICHOLAS S. PIZZO, Primary Examiner